United States Patent
Rieger et al.

(10) Patent No.: US 8,359,939 B2
(45) Date of Patent: Jan. 29, 2013

(54) DOUBLE CLUTCH TRANSMISSION

(75) Inventors: Wolfgang Rieger, Friedrichshafen (DE);
Matthias Reisch, Ravensburg (DE);
Juergen Wafzig, Eriskirich (DE);
Gerhard Gumpoltsberger,
Friedrichshafen (DE)

(73) Assignee: ZF Friedrichshafen, Friedrichshafen (DE)

( * ) Notice: Subject to any disclaimer, the term of this patent is extended or adjusted under 35 U.S.C. 154(b) by 428 days.

(21) Appl. No.: 12/758,895

(22) Filed: Apr. 13, 2010

(65) Prior Publication Data

US 2010/0257955 A1    Oct. 14, 2010

(30) Foreign Application Priority Data

Apr. 14, 2009 (DE) .................... 10 2009 002 342

(51) Int. Cl.
*F16H 3/08* (2006.01)
(52) U.S. Cl. ......................................................... 74/330
(58) Field of Classification Search .................... 74/330, 74/333, 340
See application file for complete search history.

(56) References Cited

U.S. PATENT DOCUMENTS

| | | | | |
|---|---|---|---|---|
| 6,869,379 B2 * | 3/2005 | Voss et al. | ...................... | 475/218 |
| 7,066,043 B2 * | 6/2006 | Kim et al. | ........................ | 74/330 |
| 7,225,696 B2 * | 6/2007 | Gitt | ................................. | 74/340 |
| 7,597,644 B2 * | 10/2009 | Rodgers, II | .................... | 475/218 |
| 7,604,561 B2 * | 10/2009 | Earhart | .......................... | 475/218 |
| 7,604,565 B2 * | 10/2009 | Lee et al. | ........................... | 477/3 |
| 8,051,732 B2 * | 11/2011 | Gitt | ................................. | 74/331 |
| 2005/0000307 A1 | 1/2005 | Gumpoltsberger | | |
| 2009/0036247 A1 * | 2/2009 | Earhart et al. | ................. | 475/35 |

FOREIGN PATENT DOCUMENTS

| | | |
|---|---|---|
| DE | 38 22 330 A1 | 7/1989 |
| DE | 100 15 336 A1 | 10/2001 |
| DE | 103 05 241 A1 | 9/2004 |
| DE | 10 2004 001 961 A1 | 8/2005 |
| DE | 10 2005 028 532 A1 | 12/2006 |
| DE | 10 2007 049 257 A1 | 4/2009 |
| DE | 10 2007 049 259 A1 | 4/2009 |
| DE | 10 2007 049 260 A1 | 4/2009 |
| DE | 10 2007 049 263 A1 | 4/2009 |
| DE | 10 2007 049 264 A1 | 4/2009 |
| DE | 10 2007 049 265 A1 | 4/2009 |
| DE | 10 2007 049 266 A1 | 4/2009 |
| DE | 10 2007 049 267 A1 | 4/2009 |
| DE | 10 2007 049 269 A1 | 4/2009 |
| DE | 10 2007 049 270 A1 | 4/2009 |

\* cited by examiner

*Primary Examiner* — Ha D. Ho (74) *Attorney, Agent, or Firm* — David & Bujold, PLLC (57) ABSTRACT

A double clutch transmission with two clutches having input sides connected to a drive shaft and the output sides connected to one of two transmission input shafts which are coaxially arranged, at least two countershafts on which toothed idler gearwheels are supported, toothed fixed gearwheels are arranged in a rotationally fixed manner on both of the transmission input shafts and mesh with at least one of the idler gearwheels. A plurality of coupling devices, each connecting one idler gearwheels to a countershaft in a rotationally fixed manner, and one power take-off gear provided on each of the two countershafts, each of which gearwheels is coupled with gearing of an output shaft, such that a plurality of power shift forward gears and at least one reverse gear can be shifted.

19 Claims, 8 Drawing Sheets

Fig. 1

| G | ZS | K1 | K2 | A | B | C | D | E | F | I | K | S_abi |
|---|---|---|---|---|---|---|---|---|---|---|---|---|
| G1 | i_3·i_4·i_2 |  | 1 |  |  | 1 |  |  |  |  | 1 | 1 |
| G2 | i_2 | 1 |  |  |  | 1 |  |  |  |  |  | 1 |
| G3 | i_3 | 1 | 1 |  |  |  | 1 |  |  |  |  | 1 |
| G4 | i_4 |  |  | 1 |  |  |  | 1 |  |  |  | 1 |
| G5 | i_5 | 1 | 1 |  |  |  |  |  |  |  |  | 1 |
| G6 | i_6 |  | 1 |  | 1 |  |  |  |  |  |  | 1 |
| G7 | i_4·i_3·i_5 | 1 | 1 | 1 |  |  |  |  |  |  | 1 | 1 | n. lsb.

R—GEAR.

| | | K1 | K2 | A | B | C | D | E | F | I | K | S_abi |
|---|---|---|---|---|---|---|---|---|---|---|---|---|
| R1 | i_R | 1 |  |  |  |  |  |  | 1 | 1 |  | 1 |
| R2 | i_5·i_6·i_R |  | 1 |  |  |  |  |  | 1 | 1 |  | 1 |
| R3 | i_3·i_4·i_R | 1 |  |  |  |  |  |  | 1 | 1 |  | 1 |

CRAWLER

| | | K1 | K2 | A | B | C | D | E | F | I | K | S_abi |
|---|---|---|---|---|---|---|---|---|---|---|---|---|
| C1 | i_5·i_6·i_2 |  | 1 | 1 |  | 1 |  |  |  |  |  | 1 |
| C2 | i_2·i_5·i_3 | 1 |  | 1 |  | 1 |  |  |  |  |  |  |

OVERDRIVE

| | | K1 | K2 | A | B | C | D | E | F | I | K | S_abi |
|---|---|---|---|---|---|---|---|---|---|---|---|---|
| O1 | i_5·i_2·i_4 |  | 1 | 1 |  | 1 |  | 1 |  |  |  |  |

| G | ZS | K1 | K2 | A | B | C | D | E | F | I | K | S_ab1 | S_ab2 |
|---|---|---|---|---|---|---|---|---|---|---|---|---|---|
| G1 | $i\_3 \cdot i\_4 \cdot i\_2$ |  | 1 |  |  | 1 |  |  |  |  |  | 1 | 1 |
| G2 | $i\_2$ | 1 |  |  | 1 | 1 |  |  |  |  |  | 1 | 1 |
| G3 | $i\_3$ |  | 1 |  | 1 |  | 1 |  |  |  |  | 1 | 1 |
| G4 | $i\_4$ | 1 |  |  |  |  | 1 |  |  |  |  | 1 | 1 |
| G5 | $i\_5$ |  | 1 | 1 |  |  |  | 1 |  |  |  | 1 | 1 |
| G6 | $i\_6$ | 1 |  |  |  |  |  |  | 1 |  |  | 1 | 1 |
| G7 | $i\_4 \cdot i\_3 \cdot i\_5$ | 1 |  | 1 |  |  |  |  |  | 1 | 1 | 1 | 1 | n. lsb.

R- GEAR

| | ZS | K1 | K2 | A | B | C | D | E | F | I | K | S_ab1 | S_ab2 |
|---|---|---|---|---|---|---|---|---|---|---|---|---|---|
| R1 | $i\_R$ | 1 |  |  | 1 |  |  |  |  |  | 1 | 1 | 1 |
| R2 | $i\_3 \cdot i\_4 \cdot i\_R$ |  | 1 |  | 1 |  |  |  | 1 |  |  | 1 | 1 |
| R3 | $i\_3 \cdot i\_6 \cdot i\_R$ |  | 1 |  |  |  | 1 |  |  |  |  |  | 1 |
| R4 | $i\_R \cdot i\_5 \cdot i\_3$ | 1 |  |  |  |  | 1 |  |  | 1 |  |  | 1 |

CRAWLER

| | ZS | K1 | K2 | A | B | C | D | E | F | I | K | S_ab1 | S_ab2 |
|---|---|---|---|---|---|---|---|---|---|---|---|---|---|
| C1 | $i\_2 \cdot i\_5 \cdot i\_3$ | 1 |  | 1 |  |  | 1 |  |  |  |  | 1 |  |

OVERDRIVE

| | ZS | K1 | K2 | A | B | C | D | E | F | I | K | S_ab1 | S_ab2 |
|---|---|---|---|---|---|---|---|---|---|---|---|---|---|
| O1 | $i\_5 \cdot i\_2 \cdot i\_4$ |  | 1 | 1 |  |  |  | 1 |  |  |  |  | 1 |
| O2 | $i\_6 \cdot i\_3 \cdot i\_5$ |  | 1 | 1 |  |  | 1 |  | 1 |  |  | 1 |  |

| G | ZS | K1 | K2 | A | B | C | D | E | F | I | S_ab1 | S_ab2 |
|---|---|---|---|---|---|---|---|---|---|---|---|---|
| G1 | $i\_3 \cdot i\_4 \cdot i\_2$ |  | 1 |  | 1 |  | 1 |  |  |  | 1 | 1 |
| G2 | $i\_2$ | 1 |  |  | 1 |  |  |  |  |  | 1 | 1 |
| G3 | $i\_3$ | 1 |  |  |  |  | 1 |  |  |  | 1 | 1 |
| G4 | $i\_4$ |  | 1 |  |  |  |  |  | 1 |  | 1 | 1 |
| G5 | $i\_5$ |  | 1 | 1 |  |  |  |  |  |  | 1 | 1 |
| G6 | $i\_6$ | 1 |  |  |  | 1 |  |  |  |  | 1 | 1 |
| G7 | $i\_4 \cdot i\_3 \cdot i\_5$ | 1 |  | 1 |  |  | 1 |  | 1 |  |  |  | n. lsb.

R- GEAR

| | ZS | K1 | K2 | A | B | C | D | E | F | I | S_ab1 | S_ab2 |
|---|---|---|---|---|---|---|---|---|---|---|---|---|
| R1 | $i\_R$ | 1 |  |  |  |  |  |  |  |  | 1 | 1 |
| R2 | $i\_5 \cdot i\_6 \cdot i\_R$ |  | 1 | 1 |  |  |  | 1 |  |  | 1 | 1 |

CRAWLER

| | ZS | K1 | K2 | A | B | C | D | E | F | I | S_ab1 | S_ab2 |
|---|---|---|---|---|---|---|---|---|---|---|---|---|
| C1 | $i\_2 \cdot i\_5 \cdot i\_3$ | 1 |  |  |  |  | 1 |  |  | 1 | 1 | 1 |

OVERDRIVE

| | ZS | K1 | K2 | A | B | C | D | E | F | I | S_ab1 | S_ab2 |
|---|---|---|---|---|---|---|---|---|---|---|---|---|
| O1 | $i\_5 \cdot i\_2 \cdot i\_6$ |  | 1 |  |  |  |  |  | 1 | 1 | 1 | 1 |

| G | ZS | K1 | K2 | A | B | C | D | E | F | I | K | S_ab1 | S_ab2 |
|---|---|---|---|---|---|---|---|---|---|---|---|---|---|
| G1 | i3_i4_i2 |   |   |   | 1 |   | 1 |   | 1 |   |   | 1 |   |
| G2 | i2 | 1 |   | 1 |   |   |   |   |   |   |   | 1 | 1 |
| G3 | i3 |   | 1 |   |   |   | 1 |   | 1 |   |   | 1 | 1 |
| G4 | i4 | 1 |   |   |   |   |   |   | 1 |   |   | 1 | 1 |
| G5 | i5 |   | 1 | 1 |   |   |   |   |   |   | 1 | 1 | 1 |
| G6 | i6 | 1 |   |   |   |   |   | 1 |   |   |   | 1 | 1 |
| G7 | i4_i3_i5 | 1 |   | 1 |   |   | 1 |   | 1 |   |   | 1 |   |

R- GEAR

| | | K1 | K2 | A | B | C | D | E | F | I | K | S_ab1 | S_ab2 |
|---|---|---|---|---|---|---|---|---|---|---|---|---|---|
| R1 | iR | 1 |   |   |   | 1 |   |   |   |   |   | 1 | 1 |
| R2 | i3_i6_iR |   | 1 |   |   | 1 | 1 |   |   |   |   | 1 | 1 |
| R3 | i3_i4_iR |   | 1 |   |   | 1 | 1 |   | 1 |   |   | 1 | 1 |
| R4 | iR_i5_i3 | 1 |   | 1 |   | 1 |   |   |   |   |   | 1 |   |
| R5 | i3_i6_iR |   | 1 |   |   | 1 | 1 |   | 1 |   |   | 1 |   |

CRAWLER

| | | K1 | K2 | A | B | C | D | E | F | I | K | S_ab1 | S_ab2 |
|---|---|---|---|---|---|---|---|---|---|---|---|---|---|
| C1 | i2_i5_i3 | 1 |   |   |   |   | 1 |   |   | 1 |   | 1 | 1 |

OVERDRIVE

| | | K1 | K2 | A | B | C | D | E | F | I | K | S_ab1 | S_ab2 |
|---|---|---|---|---|---|---|---|---|---|---|---|---|---|
| O1 | i5_i2_i4 |   | 1 | 1 |   |   |   |   | 1 |   |   | 1 | 1 |
| O2 | i6_i3_i5 | 1 |   | 1 |   |   | 1 | 1 |   |   | 1 | 1 | 1 |
| O3 | i6_i3_i5 | 1 |   |   |   |   | 1 | 1 | 1 |   | 1 | 1 | 1 | n. lsb.

DOUBLE CLUTCH TRANSMISSION

This application claims priority from German patent application serial no. 10 2009 002 342.9 filed Apr. 14, 2009.

FIELD OF THE INVENTION

The present invention relates to a double clutch transmission.

BACKGROUND OF THE INVENTION

From the published patent DE 103 05 241 A1, a six or seven-geared double clutch transmission is known. The double clutch transmission comprises two clutches, each of which has an input side connected to the drive shaft and an output side connected to one of the two transmission input shafts. The two transmission input shafts are arranged coaxially to each other. In addition, two countershafts are arranged parallel to the axis of the two transmission input shafts which have idler gears meshed with fixed gears of the transmission input shafts. Furthermore, coupling devices are held in a rotationally fixed manner and axially adjustable on the countershafts in order to be able to shift each toothed gearwheel. Each selected transmission ratio is transmitted over the power take-off gears to a differential. To achieve the desired transmission ratio steps with the known double clutch transmission, a multiplicity of gear planes are necessary, which results in the need for a not insignificant construction space during assembly.

Furthermore, a spur-gear multi-speed transmission is known from published patent DE 38 22 330 A1. The spur-gear multi-speed transmission comprises a double clutch which can be power-shifted, of which one part is connected to a drive shaft and another part is connected to a hollow drive shaft that is rotatably fixed on the drive shaft. For certain transmission ratios, the drive shaft can be coupled with the hollow drive shaft via a shift element.

From published patent DE 10 2004 001 961 A1, a power-shift transmission with two clutches is known, each assigned to a subtransmission. The transmission input shafts of the two subtransmissions are arranged coaxially to each other and mesh, via fixed gears, with idler gears of the assigned countershafts. Each of the idler gears of the countershafts can be connected to each countershaft by the assigned shift elements in a rotationally fixed manner. This published patent makes known, among other things, a seven-geared transmission, in which an additional shift element for coupling the two transmission input shafts is provided for the realization of a further transmission ratio step. The seven-geared transmission requires at least six gear planes in both subtransmissions in this embodiment to attain the transmission ratio steps. This leads to an undesirable lengthening of the construction length in the axial direction, limiting the possibility of mounting into a vehicle.

Furthermore, published patent DE 10 2005 028 532 A1 makes known an additional power-shift transmission, which comprises two input shafts and only one countershaft. The seven-geared transmission requires at least five gear planes in this embodiment to be able to realize the transmission ratio steps, which leads to an undesirable lengthening of the construction length in the axial direction. Moreover, an additional shaft with one gear plane is necessary, which comprises one shift element and two gears for the attainment of the reverse motion transmission ratios. Another disadvantage of the known power-shift transmission is that power-shifting is only possible between the first and second gears.

SUMMARY OF THE INVENTION

The problem at the basis of the present invention is to propose a double clutch transmission of the type described in the beginning in which a plurality of power-shifting transmission ratio steps are achieved as cost-effectively as possible and with the least number of construction elements and with little demand for construction space.

Accordingly, a double clutch transmission optimized for construction space is proposed with two clutches, of which the input sides are connected to a drive shaft and of which the output sides are connected to one of e.g. two coaxially arranged transmission input shafts. The double clutch transmission comprises at least two countershafts or similar on which toothed gearwheels are rotatably fixed and designed as idler gears, wherein on the two transmission input shafts, toothed gearwheels are arranged in a rotationally fixed manner and designed as fixed gears and at least partly mesh with the idler gears. Furthermore, a plurality of coupling devices are provided for the rotationally fixed connection of an idler gear to a countershaft. In addition, the double clutch transmission comprises one power take-off gear provided on each of the two countershafts and is coupled with a gearing of an output shaft. The proposed double clutch transmission enables a plurality of power-shiftable forward gears and at least one power-shiftable reverse gear to be shifted.

According to the invention, the proposed double clutch transmission comprises preferably only four gear planes, wherein for example the gear stage or transmission ratio step of the third forward gear and the gear stage of the fifth forward gear are each assigned to a single gear plane for which one idler gear of the countershafts is assigned to a fixed gear of one of the transmission input shafts. In this way a so-called divided gear plane is formed by the two single gear planes. Furthermore, for example, the gear stage or the transmission ratio step of the second forward gear, the fourth forward gear, the sixth forward gear and the reverse gears can be assigned to double gear planes, and in each double gear plane a fixed gear of one of the transmission input shafts can be assigned to an idler gear of the first and second countershaft, wherein in each double gear plane, at least one idler gear is usable for at least two gears, so that at least one power-shifting winding path gear is shiftable via at least one shift element and/or via at least one coupling device assigned and engaged to the power take-off gear.

For the optimization of the graduation in the proposed inventive double clutch transmission, an additional double gear plane can be replaced by two single gear planes, for example, by replacing one fixed gear with two fixed gears. A particularly harmonious, progressive gear staging can be achieved thereby, especially for the gear stages four, five, six and seven. Furthermore, a maximum of five shifting positions per countershaft is used, which can be realized by shift elements and/or coupling devices. Because of the small number of shifting positions, a maximum of two activation mechanisms is needed for the activation of the shift elements or coupling devices on each countershaft. However, more activation mechanisms can also be provided.

The proposed double clutch transmission is feasible preferably as a seven-gear transmission with at least six power-shiftable gear stages. Because of the short design in contrast to known transmission arrangements, the inventive double clutch transmission is especially suitable for a front/transverse design of a vehicle. However, other construction designs are possible according to the type and construction space of the specific vehicle in question.

For the proposed double clutch transmission, the third forward gear and the fifth forward gear can be assigned preferably to a single gear plane, by dividing the first gear plane into two single gear planes. If the last or next-to-last gear increment is made higher than the previous one, a downshift requested by the driver puts a particularly high output torque or drive power at his/her disposal.

As part of the invention, an idler gear of the second subtransmission can be connected to an idler gear of the first subtransmission via at least one first shift element on the second countershaft, wherein at least the first forward gear, the seventh forward gear and at least one reverse gear are each shiftable via the first shift element as a winding path gear. Thus, the first forward gear and the seventh forward gear can be realized as winding path gears, via the gear stages of the third forward gear and the fourth forward gear, among others.

Thus, with the double clutch transmission according to the invention, winding path gears can be realized at least via the at least one shift element, and for the winding path gears the toothed gearwheels of both subtransmissions are coupled with each other in order to attain a flow of power through both subtransmissions. Each shift element used serves to couple two idler gears and thereby makes the transmission input shafts dependent on each other.

In the double clutch transmission, the arrangement of the shift element for the coupling of two particular idler gears can be varied such that the shift element does not have to be arranged between the idler gears which are to be coupled. Accordingly, other order positions of each shift element are conceivable, for example to optimize the connection to an actuator system.

As part of a possible embodiment of the invention, if at least one coupling device on the second countershaft is disengaged, the assigned power take-off gear is decoupled from the second countershaft, such that the first forward gear, the seventh forward gear and at least one reverse gear are shiftable as winding path gears. In this process the first forward gear as well as the seventh forward gear and the reverse gear, among others, can be realized via the gear stages of the third and fourth forward gears, wherein only three shifting positions or coupling devices are required on the countershaft.

The double clutch transmission according to the invention allows winding path gears to be realized via the at least one disengaged coupling device, wherein toothed gearwheels of both subtransmissions are coupled with each other in order to attain thereby a flow of power through both subtransmissions. Each coupling device used separates each power take-off gear from the assigned countershaft when the coupling device used is disengaged. Because of the at least one shiftable power take-off gear on one of the countershafts, on the one hand more winding path gears can be realized than with the use of a shifting element, and on the other hand the gear stepping can be better adjusted.

A possible embodiment of the double clutch transmission can provide that the first gear plane and the second gear plane, each as a single gear plane, encompass two fixed gears on the second transmission input shaft of the second subtransmission. The third gear plane and the fourth gear plane are as double gear planes assigned to two fixed gears of the first transmission input shaft of the first subtransmission. Preferably each of the four fixed gears of the two subtransmissions is used for at least two gears. Each of the countershafts has three shiftable idler gears which mesh with fixed gears of one of the two subtransmissions.

To provide the necessary drive reversal for the realization of reverse gears in the inventive double clutch transmission, at least one intermediate gear or the like, for example, can be used, which is for example arranged on an intermediate shaft. It is also possible for one of the idler gears of a countershaft to serve as an intermediate gear for at least one reverse gear. No additional intermediate shaft is necessary for the reverse gear transmission ratio since one of the idler gears meshes not only with a fixed gear but also with another shiftable idler gear of the other countershaft. Thus, the intermediate gear which is required for the reverse gear is arranged on a countershaft as a shiftable idler gear and also serves for the realization of at least one other forward gear. The intermediate gear can be executed also as a stepped gear, independently of whether this is arranged on the countershaft or on an additional intermediate shaft. It is also possible that the intermediate gear not be arranged on one of the already present countershafts but rather be provided on another separate shaft, for example on a third countershaft.

To maintain the desired transmission ratio steps, at least one bidirectionally operative coupling device or the like can be arranged on each countershaft of the inventive double clutch transmission. The provided coupling devices can connect an assigned idler gear in a rotationally fixed manner to the countershaft in the activated or engaged condition, depending on the direction of actuation. Moreover, a unidirectionally operative coupling device or the like can also be arranged on at least one of the countershafts. Coupling devices that can be used include, for example, hydraulically, electrically, pneumatically, and mechanically actuated clutches or also form-locking jaw clutches and every kind of synchronization, which serve for the connection in a rotationally fixed manner of an idler gear to a countershaft. It is possible for a bidirectionally operative coupling device to be replaced by two unidirectionally operative coupling devices or vice versa.

It is conceivable for the indicated potential arrangements of the toothed gearwheels to be varied and for the number of toothed gearwheels and the number of coupling devices to be changed in order to realize further savings in power-shifting gears or non-power-shifting gears and in construction space and parts in the proposed double clutch transmission. In particular, fixed gears of double gear planes can be divided into two fixed gears for two single gear planes. Step changes can thereby be improved. In addition, it is possible to exchange countershafts. The subtransmissions can also be exchanged, i.e. mirroring around a vertical axis. In the process hollow shaft and solid shaft are exchanged. It is thereby possible to arrange the smallest gear on the solid shaft, for example, to optimize the use of the available construction space further. In addition, adjacent gear planes can be exchanged, for example to optimize a shaft deflection and/or optimally connect a shift actuating system. Moreover the order of the coupling devices' positions on the gear plane can be varied. Furthermore, the direction of action of the coupling devices can be changed.

The gear numbering used here has been loosely specified. It is also possible to add a crawler or creep speed and/or overdrive or fast speed to improve, for example, the off-road features or the acceleration response. In addition, a first gear can be dropped, for example, to be able to optimize the totality of the step changes. The gear numbering varies with these actions correspondingly.

Independent of the specific variant embodiment of the double clutch transmission, the drive shaft and the power take-off shaft can by preference be arranged non-coaxially with each other, which produces a particularly space-saving arrangement. For example, the shafts thereby arranged spatially behind each other can be moved slightly toward each other. With this arrangement, a direct gear with transmission ratio of one can be realized via gear engagement and can be positioned advantageously and relatively easily on the fourth, fifth or sixth gear. Other possible arrangements of the drive shaft and the output shaft are also conceivable.

The proposed double clutch transmission is preferably equipped with an integrated output stage. The output stage can comprise a fixed gear as power take-off gear on the output shaft and meshes not only with a first power take-off gear as fixed gear of the first countershaft, but also with a second power take-off gear as fixed gear of the second countershaft. It is however possible that at least one of the power take-off gears be designed as an shiftable gear.

Advantageously, the lower forward gears and the reverse gears are activated via one start-up or shifting clutch to concentrate higher loads on this clutch and thereby to execute the second clutch with more effective use of space and more cost effectively. In particular, the gear planes of the proposed double clutch transmission can be arranged such that coupling can occur during start-up not only via the inner transmission input shaft but also the outer transmission input shaft and thereby via the clutch that is better suited at the time, which is possible in a concentrically arranged, radially encapsulated construction of the double clutch. The gear planes can be correspondingly arranged as mirror images of each other or exchanged.

BRIEF DESCRIPTION OF THE DRAWINGS

In the following, the present invention is explained more precisely by the use of the drawings.

DETAILED DESCRIPTION OF THE PREFERRED EMBODIMENTS

FIGS. 1, 3, 5 and 7 each show possible variant embodiments of a seven-geared double clutch transmission. Each of the shifting diagrams of the variant embodiments is represented in tables in FIGS. 2, 4, 6 and 8.

The seven-geared double clutch transmission comprises two clutches K1, K2, of which the input sides are connected to a drive shaft w_an and of which the output sides are connected to two coaxially arranged transmission input shafts w_K1, w_K2. Moreover, a torsion vibration damper 14 can also be arranged on the drive shaft w_an. In addition, two countershafts w_v1, w_v2 are provided on which gears embodied as idler gears 5, 6, 7, 8, 9, 10 are rotatably supported. On the transmission input shafts w_K1, w_K2 are gears arranged in a rotationally fixed manner and embodied as fixed gears 1, 2, 3, 4 and are at least partly meshed with the idler gears 5, 6, 7, 8, 9, 10.

To be able to connect the idler gears 5, 6, 7, 8, 9, 10 to each countershaft w_v1, w_v2, a plurality of activatable coupling devices A, B, C, D, E, F are provided on the countershafts w_v1, w_v2. In addition, power take-off gears 12, 13 are arranged on the two countershafts w_v1, w_v2 as constant pinions and are each coupled with a gearing 11 of an output shaft w_ab.

Next to the coupling devices A, B, C, D, E, F, which connect one gear and the assigned countershaft w_v1, w_v2 in a rotationally fixed manner, at least one winding path gear-shift element K is provided in the double clutch transmission for the connection in a rotationally fixed manner of two gears of a countershaft w_v1, w_v2 and/or at least one coupling device S_ab2 assigned to the power take-off gear 13 on the second countershaft w_v2, and are each disengaged for shifting at least one winding path gear at a time to release the power take-off gear 13 from the assigned countershaft so that at least one winding path gear is realized.

According to the invention, the double clutch transmission provides only four gear planes, wherein for each variant embodiment two single gear planes 5-1, 2-8 and two double gear planes 6-9; 7-10 are provided, such that at least one first forward gear and one seventh forward gear are shiftable via at least the activated shift element K or via the disengaged coupling device S_ab2. A claw or the like, for example, can be used as a shift element K for the connection of two gears or the like.

Figure 1:
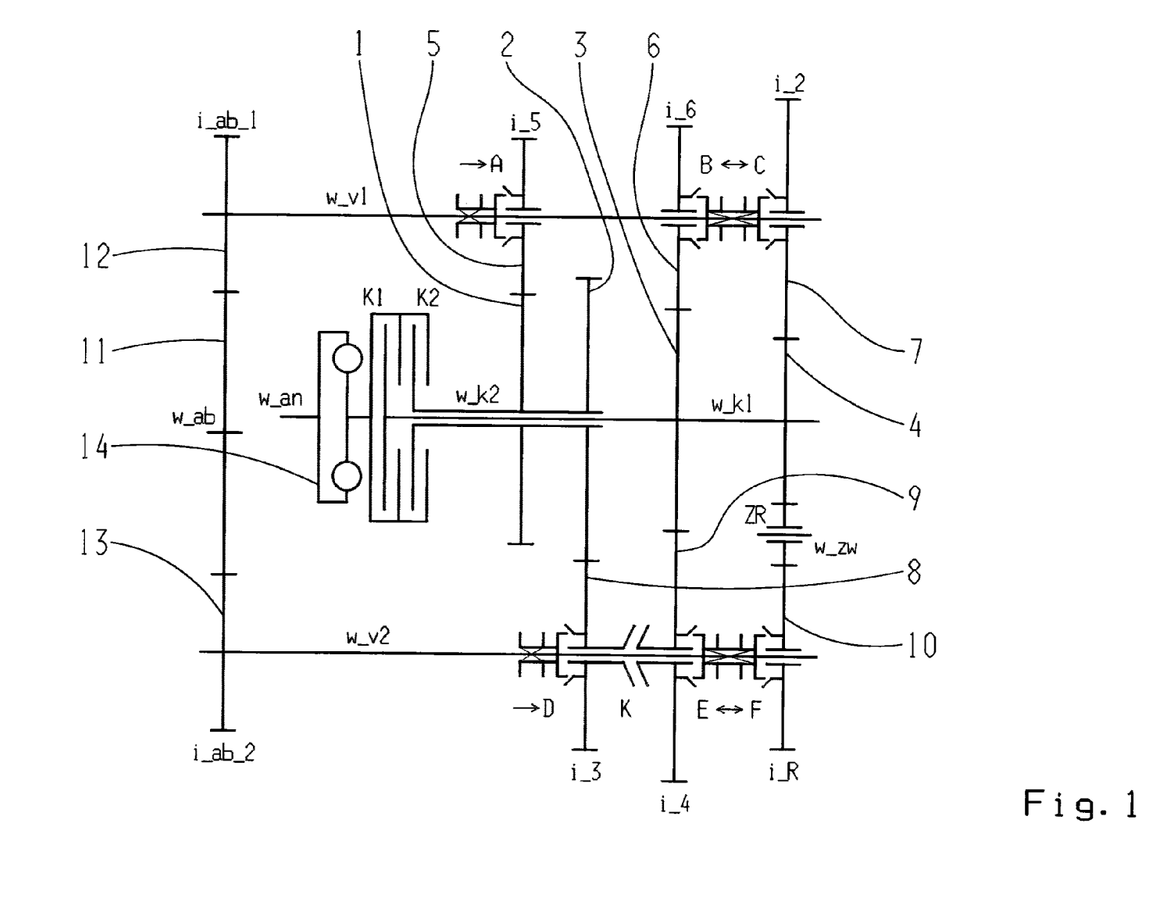
FIG. 1 shows a diagrammatic view of a first variant embodiment of a seven-geared double clutch transmission according to the invention.
Figure 3:
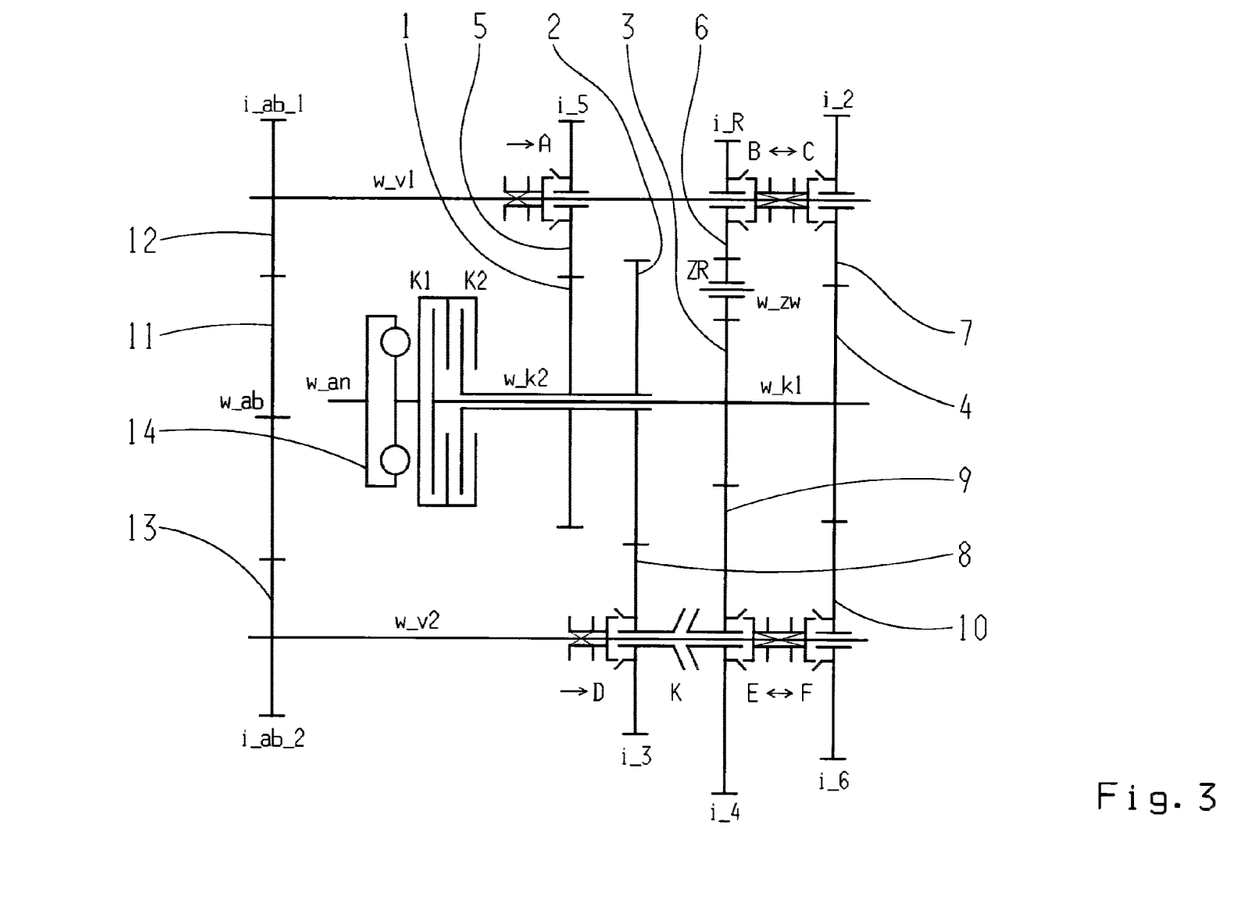
FIG. 3 shows a diagrammatic view of a second variant embodiment of the seven-geared double clutch transmission according to the invention.

In the first and second variant embodiments, the shifting element K is arranged between the second gear plane as single gear plane 2-8 and the third gear plane as double gear plane 6-9 on the second countershaft w_v2 to connect the idler gear 8 to the idler gear 9.

Independent of the specific variant embodiment, the fixed gear 1 of the second transmission input shaft w_K2 meshes in the first gear plane as single gear plane 5-1 with the idler gear 5 of the first countershaft w_v1. In the second gear plane as single gear plane 2-8, the fixed gear 2 meshes with the idler gear 8 of the second countershaft w_v2.

Figure 7:
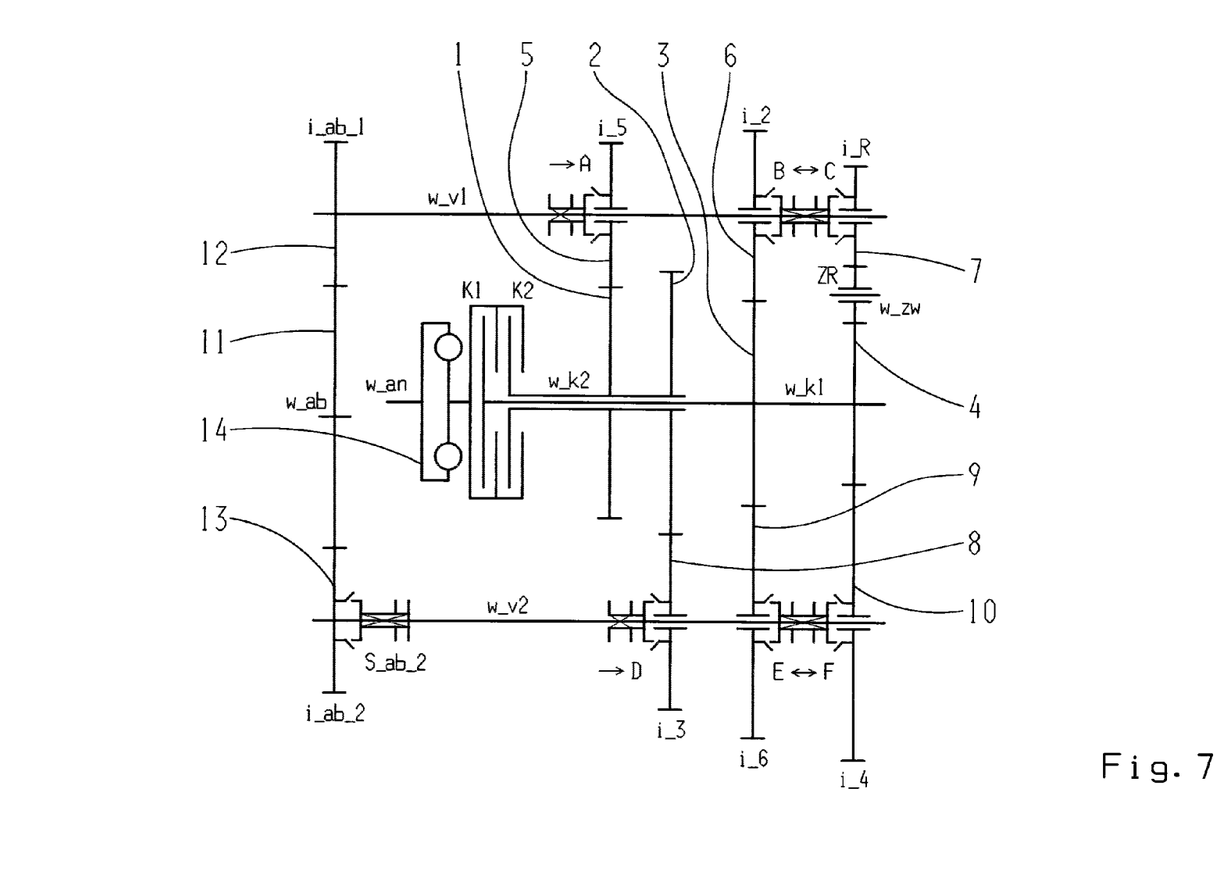
FIG. 7 shows a diagrammatic view of a fourth variant embodiment of the seven-geared double clutch transmission according to the invention.

In the first variant embodiment according to FIG. 1 and in the fourth variant embodiment according to FIG. 7, the fixed gear of the first transmission input shaft w_K1 in the third gear plane 6-9 as a double gear plane meshes with the idler gear 6 of the first countershaft w_v1 as well as with the idler gear 9 of the second countershaft w_v2. According to the first variant embodiment, the fixed gear 4 of the first transmission input shaft w_K1 meshes in the fourth gear plane 7-10 with the idler gear 7 of the first countershaft w_v1 as well as with an intermediate gear ZR, wherein the intermediate gear ZR makes possible the drive reversal for realizing at least one reverse gear R1, R2, R3. The intermediate gear ZR is arranged on an intermediate shaft w_zw in a rotatable manner and meshes with the idler gear 10 of the second countershaft w_v2, wherein the intermediate shaft w_zw as an example is arranged parallel to the countershafts w_v1, w_v2. The intermediate gear ZR meshes also with the idler gear 10 of the second countershaft w_v2. In the fourth variant embodiment, drive reversal is achieved for realizing the reverse gears R1, R2, R3, R4, R5 by having fixed gear 4 of the first transmission input shaft w_K1 mesh with the intermediate gear ZR, wherein the intermediate gear ZR is rotatably fixed on the intermediate shaft w_zw and meshes with the idler gear 7 of the first countershaft w_v1.

In the second variant embodiment according to FIG. 3, the fixed gear 3 of the first transmission input shaft w_k1 meshes in the third gear plane 6-9 with the idler gear 9 of the second countershaft w_v2 as well as with the intermediate gear ZR for the realization of the reverse gears R1, R2, R3, R4. The intermediate gear ZR is rotatably supported on the intermediate shaft w_zw and meshes also with the idler gear 6 of the first countershaft. According to the third variant embodiment corresponding to FIG. 5, the drive reversal is realized by having the intermediate gear ZR mesh with the fixed gear 3 and with the idler gear 9 of the second countershaft w_v2. In the second variant embodiment as well as with the third variant embodiment, the fixed gear 4 of the first transmission shaft w_k1 meshes in the fourth gear plane 7-10 as double gear plane with the idler gear 7 of the first countershaft w_v1 as well as with the idler gear 10 of the second countershaft w_v2.

Independent of the particular variant embodiment, a bidirectionally operative coupling device B, C; E, F is arranged on the first countershaft and the second countershaft between the third gear plane 6-9 and the fourth gear plane 7-10. With the use of the coupling device B, the idler gear 6 can be securely connected to the first countershaft w_v1; with the coupling device C, the idler gear 7 can be connected to the first countershaft w_v1; and with the coupling device E, the idler gear 9 can be connected to the second countershaft w_v2; and with the coupling device F, the idler gear 10 can be connected to the second countershaft w_v2. Moreover, a unidirectionally operative coupling device A is assigned to the first gear plane 5-1 by which coupling device the idler gear 5 is connected in a rotationally fixed manner to the first countershaft w_v1. In addition, an individually operative coupling device D is also assigned to the second gear plane 2-8 and thereby the idler gear 8 is connectable to the second countershaft w_v2.

In the inventive double shift transmission, an integrated output stage can be provided by the power take-off gear 12, which is connected in a rotationally fixed manner to the first countershaft w_v1, and by the power take-off gear 13, which is arranged on the second countershaft w_v2. The power take-off gear 12 and the power take-off gear 13 each mesh with a fixed gear 11 of the output shaft w_ab. For example, the power take-off gear 13 in the third and fourth variant embodiments of the invention according to FIGS. 5 and 7 can be released via an additional coupling device S_ab2 from the second countershaft w_v2. However, it is possible for a shiftable connection to be realized between the power take-off gear 12 and the assigned countershaft w_v1.

Figure 2:
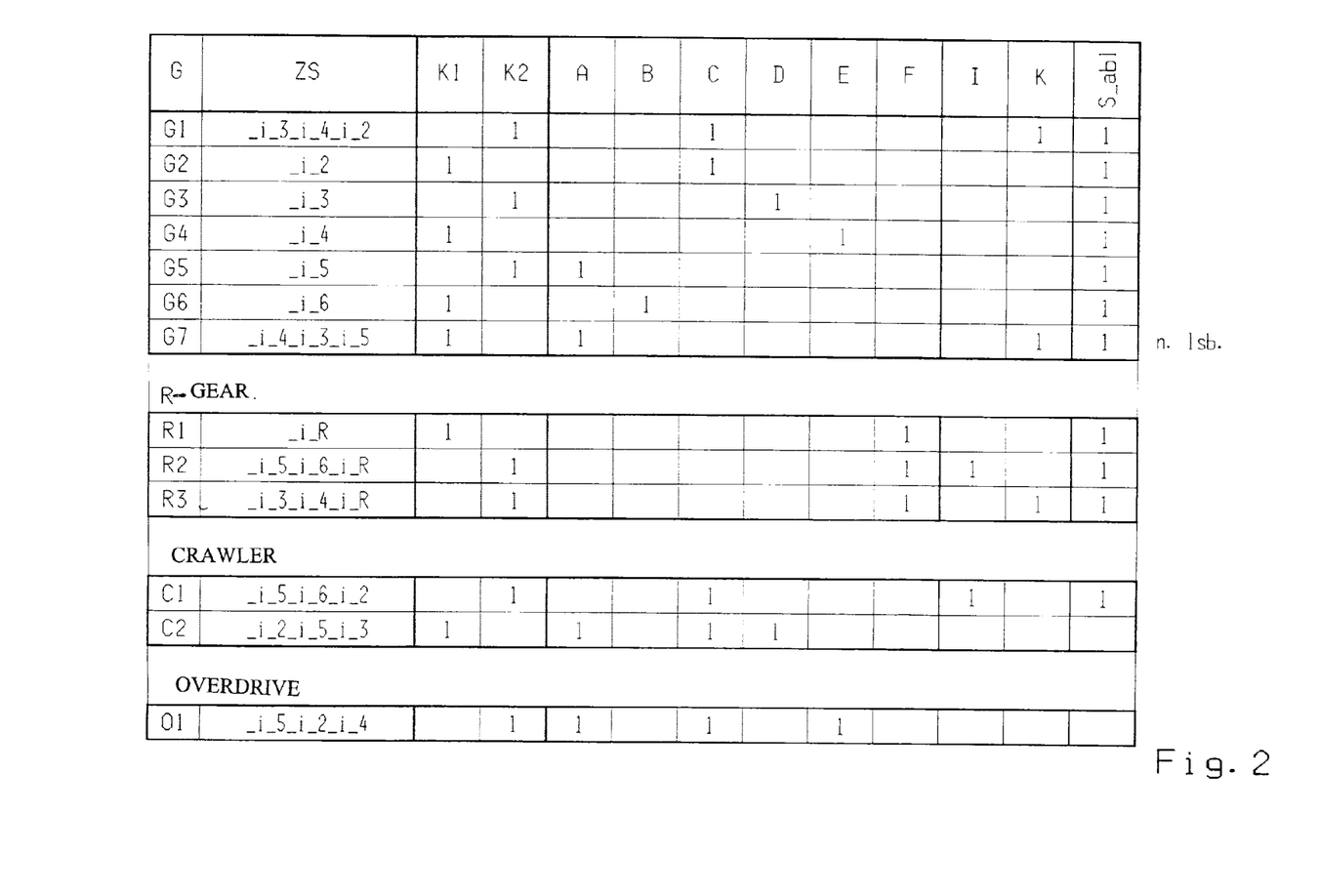
FIG. 2 shows a shifting diagram of the first variant embodiment according to FIG. 1.

The table presented in FIG. 2 displays as an example a shifting diagram for the first variant embodiment of the seven-geared double clutch transmission according to FIG. 1.

From the shifting diagram it follows that the first forward gear G1 is shiftable as winding path gear via the second clutch K2 and via the activated coupling device C as well as via the activated shift element K, that the second forward gear G2 is shiftable via the first clutch K1 and via the activated coupling device C, that the third forward gear G3 is shiftable via the second clutch K2 and via the activated coupling device D, that the fourth forward gear G4 is shiftable via the first clutch K1 and via the activated coupling device E, that the fifth forward gear G5 is shiftable via the second clutch K2 and via the activated coupling device A, that the sixth forward gear G6 is shiftable via the first clutch K1 and via the activated coupling device B, and that the seventh forward gear G7 is shiftable as a winding path gear via the first clutch K1 and via the activated coupling device A as well as via the activated shift element K, wherein it is not feasible to make the seventh forward gear G7 power shiftable (n.lsb).

Figure 4:
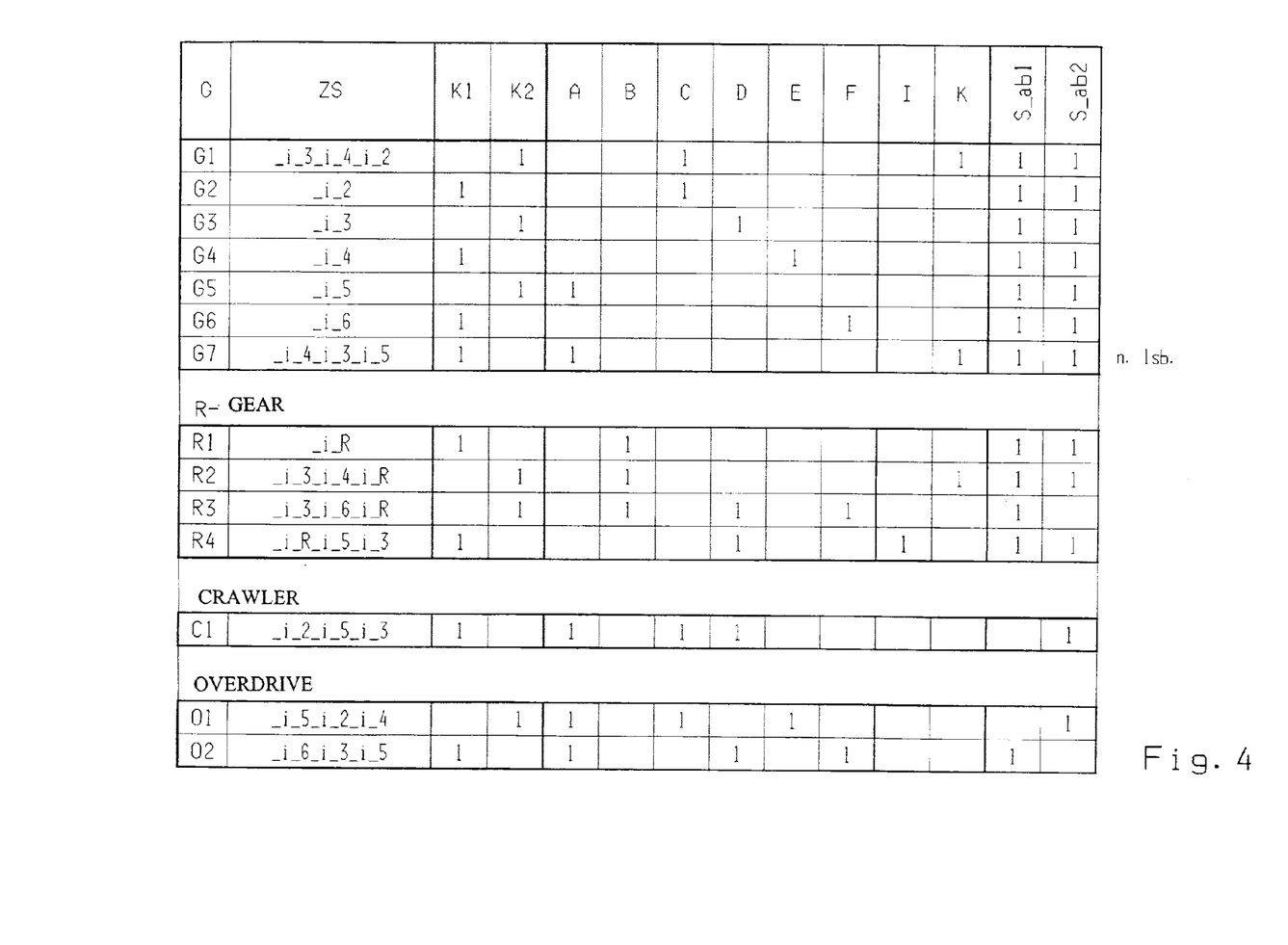
FIG. 4 shows a shifting diagram of the second variant embodiment according to FIG. 3.

The above shift diagram applies also to the second variant embodiment, with the exception that the coupling device F is activated in the sixth forward gear instead of the coupling device B.

Furthermore, from the table represented in FIG. 2 in the first variant embodiment, it can be seen that a reverse gear R1 is shiftable via the first clutch K1 and via the activated coupling device F and/or that another reverse gear R2 is shiftable as winding path gear via the second clutch K2 and via the activated coupling device F as well as via an additionally activated shift element I, wherein the additional shift element I is assigned to the first countershaft in order to connect the idler gear 5 to the idler gear 6, such that the two subtransmissions are thereby coupled with each other. An adjacent reverse gear, which also is shiftable as winding path gear, is additionally or alternatively realized via the second clutch K2 and via the activated coupling device F as well as via the activated shift element K. Furthermore, in the proposed double clutch transmission according to the first variant embodiment, a crawler gear C1 can be shifted as a winding path gear via the second clutch K2 and via the activated coupling device C as well as via an additional activated shift element I on the first countershaft w_v1. An additional or alternative crawler gear C2 is shifted as winding path gear via the first clutch K1, via the activated coupling device A, via the activated coupling device C and via the activated coupling device D as well as via an additional coupling device S_ab1 assigned to the power take-off gear 12 being disengaged. An overdrive gear O1 can also be shifted as winding path gear via the second clutch K2, via the activated coupling device A, via the activated coupling device C and via the activated coupling device E as well as via an additional coupling device S_ab1 assigned to the power take-off gear 12 being disengaged.

It can be seen in the second variant embodiment according to the table in FIG. 4 that a reverse gear R1 is shiftable via the first clutch K1 and via the activated coupling device B. An additional or alternative reverse gear R2 can be shifted as winding path gear via the second clutch K2 and via the activated coupling device B as well as via the activated shift element K. A proximal additional or alternative reverse gear R3 can be shifted as winding path gear via the second clutch K2, via the activated coupling device B, via the activated coupling device D and via the activated coupling device F as well as via an additional coupling device S_ab2 assigned to the power take-off gear 13 being disengaged. Finally, a proximal additional or alternative reverse gear R4 can be shifted as winding path gear via the first clutch K1 and via the activated coupling device D as well as via an additional, activated shift element I.

In the second variant embodiment, a crawler gear C1 can also be shifted as winding path gear via the clutch K1, via the activated coupling device A, via the activated coupling device C and via the activated coupling device D as well as via an additional coupling device S_ab1 assigned to the power take-off gear 12 being disengaged. Furthermore, an overdrive gear O1 can be shifted as winding path gear via the second clutch K2, via the activated coupling device A, via the activated coupling device C and via the activated coupling device E, as well as via the additional coupling device S_ab1 assigned to the power take-off gear 12 being disengaged. An additional or alternative overdrive gear O2 is shifted as winding path gear via the first clutch K1, via the activated coupling device A, via the activated coupling device D and via the activated coupling device F as well as via the additional, coupling device S_ab2 assigned to the power take-off gear 13 being disengaged.

Figure 5:
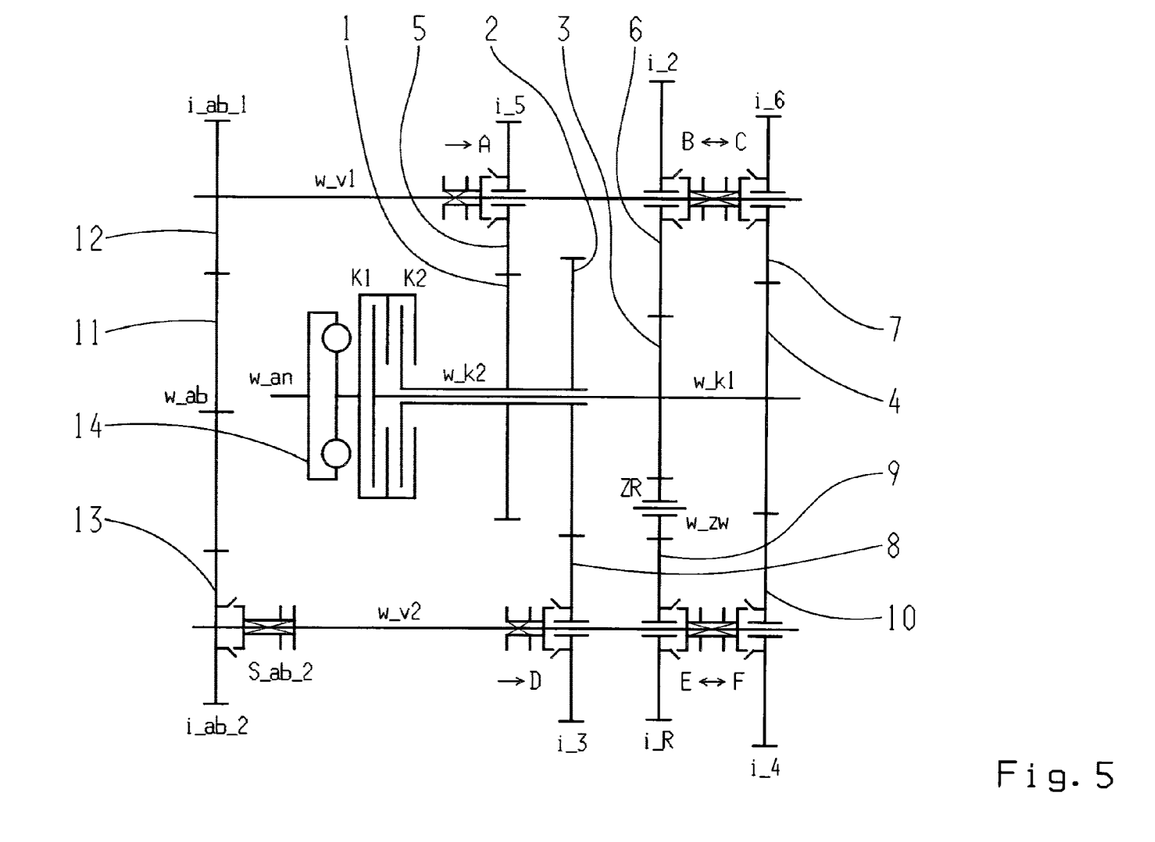
FIG. 5 shows a diagrammatic view of a third variant embodiment of the seven-geared double clutch transmission according to the invention.
Figure 6:
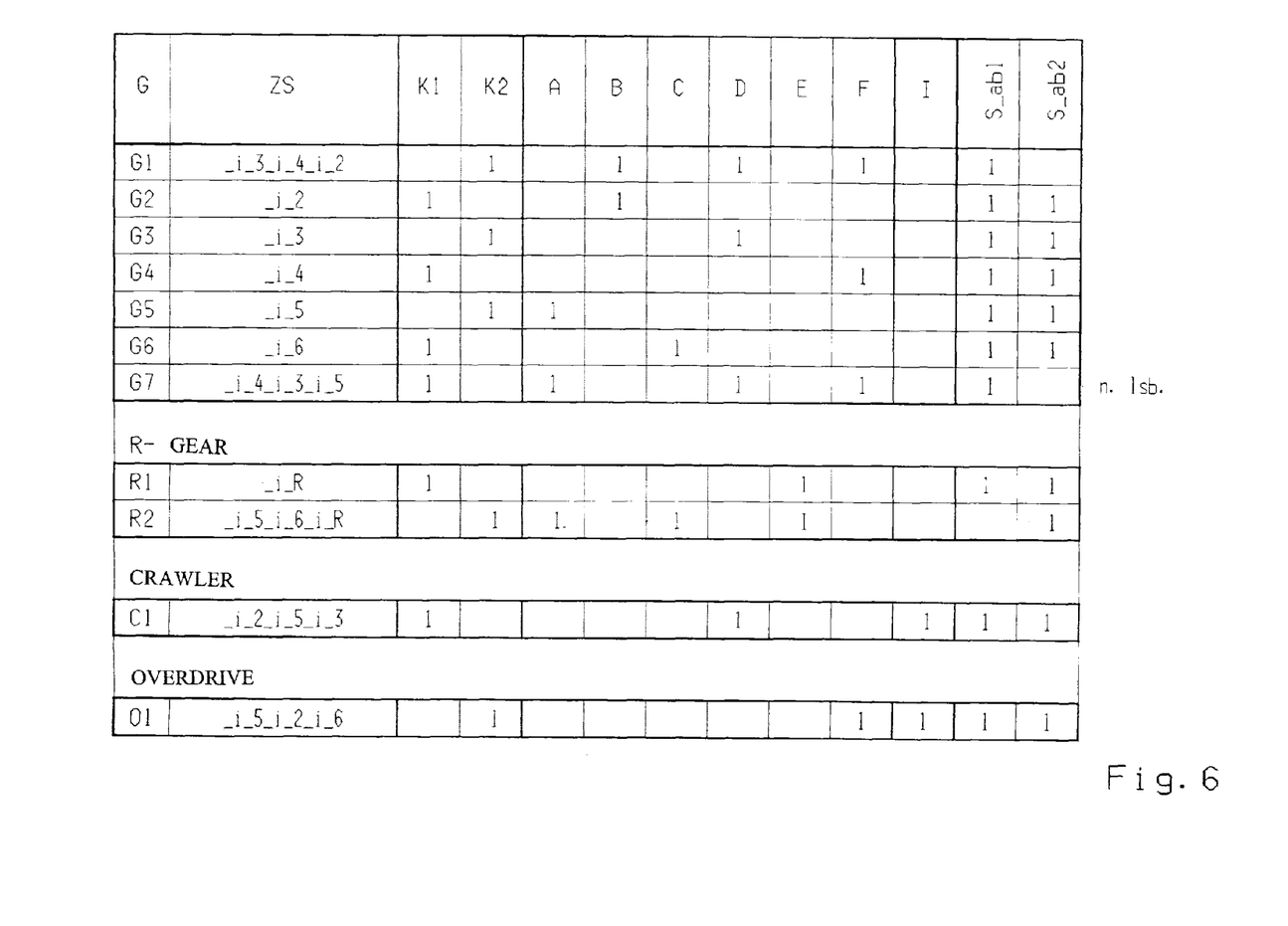
FIG. 6 shows a shifting diagram of the third variant embodiment according to FIG. 5.

A shift diagram for the third variant embodiment of the seven-geared double clutch transmission is displayed as an example in the table in FIG. 6 according to FIG. 5.

From the shifting diagrams it can be seen that the first forward gear G1 is shiftable via the second clutch K2, via the activated coupling device B, via the activated coupling device D and via the activated coupling device F as well as via the coupling device S_ab2 assigned to the power take-off gear 13 being disengaged, all as a winding path gear, that the second forward gear G2 is shiftable via the first clutch K1 and via the activated coupling device B, that the third forward gear G3 is shiftable via the second clutch K2 and via activated coupling device D, that the fourth forward gear G4 is shiftable via the first clutch K1 and via the activated coupling device F, that the fifth forward gear G5 is shiftable via the second clutch K2 and via the activated coupling device A, that the sixth forward gear G6 is shiftable via the first clutch K1 and via the activated coupling device C, and that the seventh forward gear G7 is shiftable as winding path gear via the first clutch K1, via the activated coupling device A, via the activated coupling device D and via the activated coupling device F as well as via the coupling device S_ab2 assigned to the power take-off gear 13 being disengaged.

Figure 8:
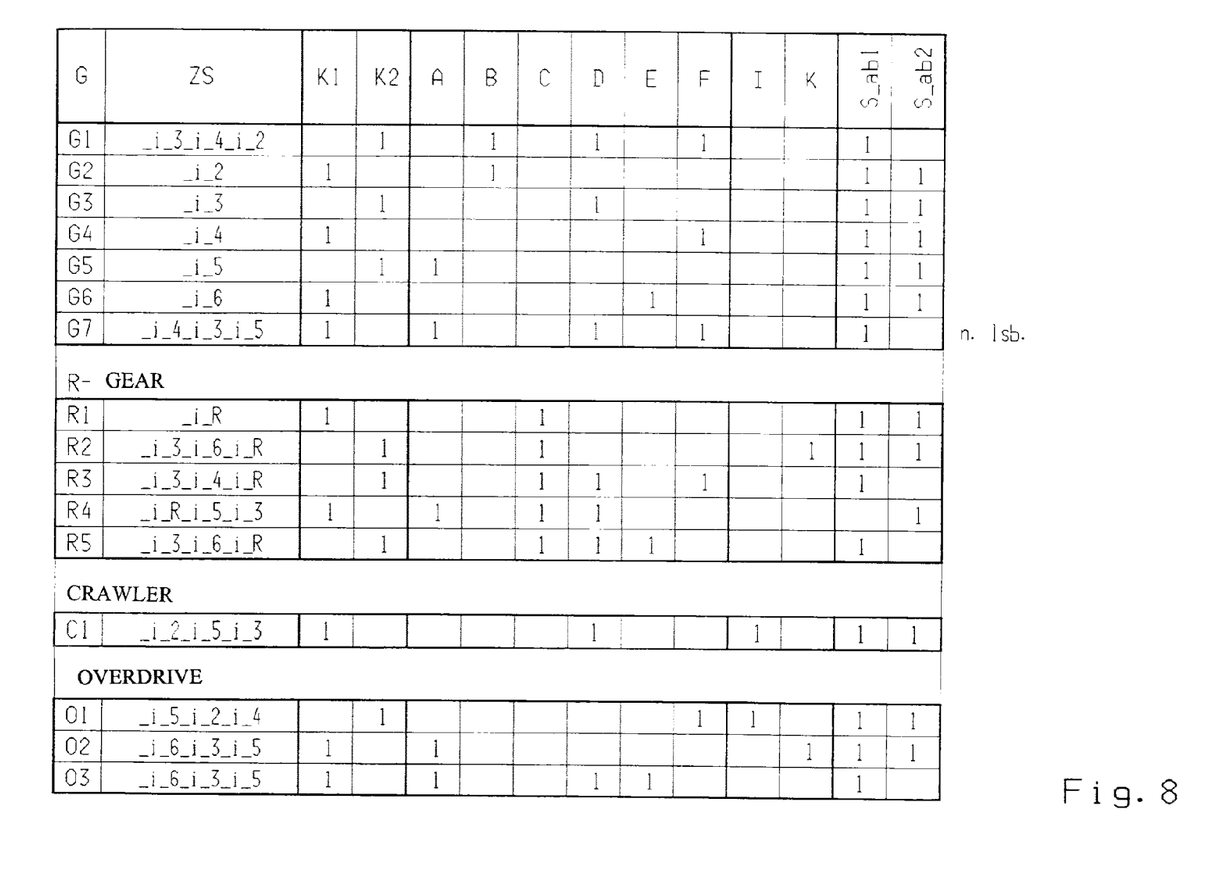
FIG. 8 shows a shifting diagram of the fourth variant embodiment according to FIG. 7.

The above-mentioned shifting diagram also applies for the fourth variant embodiment according to the table represented in FIG. 8, wherein only the sixth forward gear G6 in the fourth variant embodiment is shiftable via the first clutch K1 and via the activated coupling device E instead of coupling device C.

According to the table in FIG. 6 in the third variant embodiment, a reverse gear R1 is shiftable via the first clutch K1 and via the activated coupling device E, and an additional or alternative reverse gear R2 is shiftable as winding path gear via the second clutch K2, via the activated coupling device A, via the activated coupling device C and via the activated coupling device E as well as via an additional coupling device S_ab1 assigned to the power take-off gear 12 being disengaged.

Moreover, in the third variant embodiment, a crawler gear C1 can be shifted as winding path gear via the first clutch K1 and via the activated coupling device D as well as via the additional, activated shift element I, and an additional or alternative overdrive gear O1 is shiftable as winding path gear via the second clutch K2 and via the activated coupling device F as well as via the additional, activated shift element I.

According to the table in FIG. 8 in the fourth variant embodiment, a reverse gear R1 is shiftable as winding path gear via the first clutch K1 and via the activated coupling device C, an additional or alternative reverse gear R2 is shiftable as winding path gear via the second clutch K2 and via the activated coupling device C as well as via an additional activated shift element K, an additional or alternative reverse gear R3 is shiftable as winding path gear via the second clutch K2, via the activated coupling device C, via the activated coupling device D and via the activated coupling device F as well as via the coupling device S_ab2 assigned to the power take-off gear 13 being disengaged, an additional or alternative reverse gear R4 is shiftable as winding path gear via the first clutch K1, via the activated coupling device A, via the activated coupling device C and via the activated coupling device D as well as via an additional, coupling device S_ab1 assigned to the power take-off gear 12 being disengaged, and an additional or alternative reverse gear R5 is shiftable as winding path gear via the second clutch K2, via the activated coupling device C, via the activated coupling device D and via the activated coupling device E as well as via the coupling device S_ab2 assigned to the power take-off gear 13 being disengaged.

Furthermore, in the fourth variant embodiment of the invention a crawler gear C1 can be shifted as winding path gear via the first clutch K1 and via the activated coupling device D as well as via an additional activated shift element I.

In addition, an overdrive gear O1 can be shifted as winding path gear via the second clutch K2 and via the activated coupling device F as well as via an additional, activated shift element I. Another overdrive gear O2 is shiftable as winding path gear via the first clutch K1 and via the activated coupling device A as well as via an additional activated shift element K. An additional or alternative overdrive gear O3 is shiftable as winding path gear via the first clutch K1 and via the activated coupling device A as well as via the activated coupling device D and the activated coupling device E, if the coupling device S_ab2 assigned to the power take-off gear 13 is disengaged. The overdrive gears O2 and O3 act equally, i.e. they have the same transmission ratio, but a different gearing.

From FIGS. 2, 4, 6 and 8 in the shifting diagrams, it can be seen in detail that for the first forward gear G1 beginning with the second clutch K2, the gear stages i_3, i_4 and i_2 are used, wherein the two subtransmissions in the first and second variant embodiments are coupled via the shift element K and in the third and fourth variant embodiments are coupled via the coupling device S_ab2 assigned to power take-off gear 13. In addition, for the second forward gear G2 the gear stage i_2 is used, for the third forward gear G3 the gear stage i_3 is used, for the fourth forward gear G4 the gear stage i_4 is used, for the fifth forward gear G5 the gear stage i_5 is used, for the sixth forward gear G6 the gear stage i_6 is used. In the seventh forward gear G7 the gear stages i_4, i_3 and i_5 are used beginning with the first clutch K1, wherein the two subtransmissions in the first and second variant embodiment are coupled via the shift element K and in the third and fourth variant embodiment are coupled via the coupling device S_ab2 assigned to power take-off gear 13.

To summarize, the first variant embodiment according to FIGS. 1 and 2 results in particularly small countershaft loads since the gear stage is arranged on the shaft end for the second forward gear G2 and for the reverse gears R1, R2, R3. As opposed to the usual arrangement in the shaft middle, advantages result therefrom with regard to the design of shafts and bearings.

Detailed results in the first variant embodiment show that the idler gear 5 on the first gear plane 5-1 as single gear plane is used for five forward gears G5, G7, C1, C2 and O1 and for a reverse gear R2. The idler gear 8 on the second gear plane 2-8 as single gear plane is used for four forward gears G1, G3, G7 and C2 and a reverse gear R3. Idler gear 6 is used on the third gear plane 6-9 as double gear plane for two forward gears G6 and C1 and for a reverse gear R2 plane, and the idler gear 9 is used for four forward gears G1, G4, G7 and O1 and a reverse gear R3. Finally, on the fourth gear plane 7-10 as double gear plane, the idler gear 7 is used for five forward gears G1, G2, C1, C2 and O1 and the idler gear 10 is used for three reverse gears R1, R2 and R3.

To summarize, the second variant embodiment according to FIGS. 3 and 4 results in a smaller load for the second countershaft w_v2 such that advantages regarding the design of the shafts and bearings result therefrom since the first countershaft w_v1 is loaded by the shifting of the first forward gear G1 and of the second forward gear G2 as well as of the reverse gears R1, R2, R3, R4.

The second variant embodiment shows in detail that the idler gear 5 on the first gear plane 5-1 as single gear plane is used for five forward gears G5, G7, C1, O1 and O2 and for a reverse gear R4. The idler gear 8 on the second gear plane 2-8 as single gear plane is used for five forward gears G1, G3, G7, C1 and O2 as well as for three reverse gears R2, R3, R4. The idler gear 6 on the third gear plane 6-9 as double gear plane is used only for the reverse gears R1 to R4 and the idler gear 9 is used for four forward gears G1, G4, G7 and O1 and for a reverse gear R2. Finally, the idler gear 7 on the fourth gear plane 7-10 as double gear plane is used for four forward gears G1, G2, C1 and O1, and the idler gear 10 is used for two forward gears G6 and O2 and for one reverse gear R3.

To summarize, the third variant embodiment results in an equalized load of the two countershafts w_v1 and w_v2 since the first countershaft w_v1 is loaded by the toothed gearwheels for the first forward gear G1, the second forward gear G2, the fifth forward gear G5 and for the sixth forward gear G6, and the second countershaft w_v2 is loaded by the toothed gearwheels for the third forward gear G3, the fourth forward gear G4 and the reverse gears R1 and R2.

The third variant embodiment shows in detail that the idler gear 5 on the first gear plane 5-1 as single gear plane is used for four forward gears G5, G7, C1 and O1 and for one reverse gear R2. The idler gear 8 on the second gear plane 2-8 as single gear plane is used for four forward gears G1, G3, G7 and C1. The idler gear 6 on the third gear plane 6-9 as double gear plane is used for four forward gears G1, G2, C1 and O1 and the idler gear 9 is used for two reverse gears R1 and R2. Finally, the idler gear 7 on the fourth gear plane 7-10 as double gear plane is used for two forward gears G6 and O1 and for a reverse gear R2, and the idler gear 10 is used for three forward gears G1, G4 and G7.

In summary, the fourth variant embodiment results in fuel savings since a third overdrive gear O3 is realized and three reverse gears R2, R3 and R5 which are power shiftable to the reverse gear R1 are enabled.

The fourth variant embodiment shows in detail that the idler gear 5 on the first gear plane 5-1 as single gear plane is used for six forward gears G5, G7, C1, O1, O2 and O3 and for a reverse gear R4. The idler gear 8 on the second gear plane 2-8 as single gear plane is used for six forward gears G1, G3, G7, C1, O2 and O3 and for four reverse gears R2, R3, R4 and R5. The idler gear 6 on the third gear plane 6-9 as double gear plane is used for only four forward gears G1, G2, C1 and O1 and idler gear 9 is used for three forward gears G6, O2 and O3 as well as for two equally acting reverse gears R2 and R5. Finally, the idler gear 7 on the fourth gear plane 7-10 as double gear plane is used for only five reverse gears R1 to R5, and the idler gear 10 is used for four forward gears G1, G4, G7 and O1 and for a reverse gear R3.

In all the variant embodiments of the double clutch transmission, due to multiple usage of individual idler gears, fewer gear planes and thus fewer components are required for the same number of gears, thereby resulting in an advantageous saving of construction space and costs.

Independent of the specific variant embodiment, the number "1" in a field of each table of the shifting diagrams according to FIGS. 2, 4, 6 and 8 means that the assigned clutch K1, K2, or the assigned coupling device A, B, C, D, E, F or the assigned shift element K, I is engaged. In contrast, an empty field in each table of the shift diagrams according to FIGS. 2, 4, 6 and 8 means that the assigned clutch K1, K2 or the assigned coupling device A, B, C, D, E, F or the assigned shift element K, I is disengaged.

As a deviation from the above-named rules for the coupling device S_ab1 or S_ab2 assigned to a power take-off gear 12 or 13, the coupling device S_ab1 or S_ab2 must be disengaged when the field in the relevant table of the shift diagrams is empty according to FIGS. 2, 4, 6 and 8, but the coupling element S_ab1 or S_ab2 must be engaged when the field is filled with the numeral "1" depending on the gear for a first group of gears, and the coupling element S_ab1 or S_ab2 for a second group of gears can be either disengaged or engaged.

Furthermore, in many cases it is possible to introduce other coupling or shift elements without influencing the flow of power. This can thereby enable a gear preselection.

REFERENCE CHARACTERS

1 Fixed gear of the second transmission input shaft
2 Fixed gear of the second transmission input shaft
3 Fixed gear of the first transmission input shaft
4 Fixed gear of the first transmission input shaft
5 Idler gear of the first countershaft
6 Idler gear of the first countershaft
7 Idler gear of the first countershaft
8 Idler gear of the second countershaft
9 Idler gear of the second countershaft
10 Idler gear of the second countershaft
K1 First clutch
K2 Second clutch
w_an Drive shaft
w_ab Output shaft
w_v1 First countershaft
w_v2 Second countershaft
A Coupling device
B Coupling device
C Coupling device
D Coupling device
E Coupling device
F Coupling device
i_1 Gear stage of the first forward gear
i_2 Gear stage of the second forward gear
i_3 Gear stage of the third forward gear
i_4 Gear stage of the fourth forward gear
i_5 Gear stage of the fifth forward gear
i_6 Gear stage of the sixth forward gear
G1 First forward gear
G2 Second forward gear
G3 Third forward gear
G4 Fourth forward gear
G5 Fifth forward gear
G6 Sixth forward gear
G7 Seventh forward gear
C1 Crawler gear
C2 Crawler gear
O1 Overdrive gear
O2 Overdrive gear
O3 Overdrive gear
R1 Reverse gear
R2 Reverse gear
R3 Reverse gear
R4 Reverse gear
R5 Reverse gear
w_zw Intermediate shaft
ZR Intermediate gear
11 Fixed gear of the output shaft
12 Power take-off gear of the first countershaft
13 Power take-off gear of the second countershaft
14 Torsion vibration damper
ZS Used gear stage
K Shift element
I Shift element optional
S_ab1 Coupling device optional
S_ab2 Coupling device
n.lsb. Not power shiftable

The invention claimed is:

1. A double clutch transmission comprising:
first and second clutches (K1, K2), each comprising an input side connected to a drive shaft (w_an) and an output side connected to one of first and second transmission input shafts (w_K1, w_K2) arranged coaxially with each other;
at least first and second countershafts (w_v1, w_v2) rotatably supporting toothed idler gearwheels (5, 6, 7, 8, 9, 10);
toothed fixed gearwheels (1, 2, 3, 4) being connected in a rotationally fixed manner one of to the first and the second input shafts (w_K1, w_K2) and engaging at least some of the idler gears (5, 6, 7, 8, 9, 10);
a plurality of coupling devices (A, B, C, D, E, F), each coupling one of the idler gearwheels (5, 6, 7, 8, 9, 10) to one of the first and the second countershafts (w_v1, w_v2) in a rotationally fixed manner;
the first and the second countershafts (w_v1, w_v2), each supporting one power take-off gear (12,13) meshing with a gearing of an ouput shaft (w_ab) such that a plurality of power shiftable forward gears (1, 2, 3, 4, 5, 6) and at least one reverse gear (R1, R2, R3, R4, R5) are shiftable;
a gear stage (i_3) of a third forward gear (G3) and a gear stage (i_5) of a fifth forward gear (G5) each being assigned to a single gear plane (5-1, 2-8) in which an idler gearwheel (5, 8) of the first and the second countershafts (w_v1, w_v2) is assigned to a fixed gear (1, 2) of one of the first and the second transmission input shafts (w_K1, w_K2);
a gear stage (i_2) of a second forward gear (G2), a gear stage (i_4) of a fourth forward gear (G4), a gear stage (i_6) of a sixth forward gear (6) and a gear stage (i_R) of at least one reverse gear being assigned to double gear planes (6-9, 7-10) in which an idler gearwheel (6, 9; 7, 10) of the first and the second countershafts (w_v1, w_v2) in each double gear plane (6-9, 7-10) is assigned to one fixed gearwheel (1, 2, 3, 4) of one of the first and the second transmission input shafts (w_K1, w_K2); and
at least one idler gearwheel (6, 9; 7, 10) in each of the double gear planes (6-9, 7-10) is usable for at least two gears such that at least one power shiftable winding path gear is shiftable via at least one of a first shift element (K) and a second output coupling device (S_ab2) assigned to a second power take-off gear (13) being disengaged.

2. The double clutch transmission according to claim 1, wherein an idler gear (8) of a second subtransmission is connectable, via the first shift element (K) on the second countershaft (w_v2), to an idler gear (9) of a first subtransmission such that a first forward gear (G1) is shifted as a first one of the at least one winding-path gear via the first shift element (K) and a seventh forward gear (G7) is shiftable as a second one of the at least one winding path gear via the first shift element (K).

3. The double clutch transmission according to claim 1, wherein an idler gear (8) of a second subtransmission is connectable to an idler gear (9) of a first subtransmission via the first shift element (K) on the second countershaft (w_v2) such that a first reverse gear (R2, R3) is shiftable as a first one of the at least one winding path gear, via the first shift element (K), and a further idler gearwheel (5) of the second subtransmission is connectable to a further idler gearwheel (6) of the first subtransmission, via a second shift element (I) on the first countershaft (w_v1), such that a second reverse gear (R2, R4) is shiftable as a second one of the at least one winding path gear via the second shift element (I).

4. The double clutch transmission according to claim 1, wherein the second power take-off gear (13) is decoupled from the second countershaft (w_v2), when the second output coupling device (S_ab2) on the second countershaft (w_v2) is disengaged, such that a first forward gear (G1) is shifted as a first one of the at least one winding path gear and a seventh forward gear (G7) is shifted as a second one of the at least one winding path gear.

5. The double clutch transmission according to claim 1, wherein the second power take-off gear (13) is decoupled from the second countershaft (w_v2), when the second output coupling device (S_ab2) on the second countershaft (w_v2) is disengaged, such that at least one reverse gear (R3, R5) is shifted as the at least one winding path gear.

6. The double clutch transmission according to claim 1, wherein a first gear plane is a single gear plane (5-1) and a second gear plane is a single gear plane (2-8) comprising two fixed gearwheels (1, 2) on the second transmission input shaft (w_K2) of a second subtransmission, and a third gear plane is a double gear plane (6-9) and a fourth gear plane is a double gear plane (7-10) comprising two fixed gearwheels (3, 4) on the first transmission input shaft (w_K1) of a first subtransmission.

7. The double clutch transmission according to claim 1, wherein
a first forward gear (G1) is shiftable as a first one of the at least one winding path gear via the second clutch (K2), an activated third coupling device (C) and the activated first shift element (K);
the second forward gear (G2) is shiftable via the first clutch (K1) and the activated third coupling device (C);
the third forward gear (G3) is shiftable via the second clutch (K2) and an activated fourth coupling device (D);
the fourth forward gear (G4) is shiftable via the first clutch (K1) and an activated fifth coupling device (E);
the fifth forward gear (G5) is shiftable via the second clutch (K2) and an activated first coupling device (A); and
a sixth forward gear (G6) is shiftable via the first clutch (K1) and the activated second third coupling device (C);
a seventh forward gear (G7) is shiftable as a second one of the at least one winding path gear via the first clutch (K1), the activated first coupling device (A) and the activated first shift element (K).

8. The double clutch transmission according to claim 7, wherein
a first reverse gear (R1) is shiftable via the first clutch (K1) and an activated sixth coupling device (F);
a second reverse gear (R2) is shiftable via the second clutch (K2), the activated sixth coupling device (F) and a second shift element (I); and
a proximal third reverse gear (R3) is shiftable as a third one of the at least one winding path gear via the activated sixth coupling device (F) and the activated first shift element (K).

9. The double clutch transmission according to claim 7, wherein
a first crawler gear (C1) is shiftable as a third one of the at least one winding path gear via the second clutch (K2), the activated third coupling device (C) and the activated second shift element (I);
a second crawler gear (C2) is shiftable as a fourth one of the at least one winding path gear via the first clutch (K1), the activated first coupling device (A), the activated third coupling device (C), the activated fourth coupling device (D) by disengagement of a first output coupling device (S_ab1) assigned to a first power take-off gear (12).

10. The double clutch transmission according to claim 7, wherein a first overdrive gear (O1) is shiftable as a third one of the at least one winding path gear via the second clutch (K2), the activated first coupling device (A), the activated third coupling device (C), the activated fifth coupling device (E) and by disengagement of a first output coupling device (S_ab1) assigned to a power take-off gear (12).

11. The double clutch transmission according to claim 1, wherein
a first forward gear (G1) is shiftable as a first one of the at least one winding path gear via the second clutch (K2), an activated third coupling device (C) and the activated first shift element (K);
the second forward gear (G2) is shiftable via the first clutch (K1) and the activated third coupling device (C);
the third forward gear (G3) is shiftable via the second clutch (K2) and an activated fourth coupling device (D);
the fourth forward gear (G4) is shiftable via the first clutch (K1) and an activated fifth coupling device (E);
the fifth forward gear (G5) is shiftable via the second clutch (K2) and an activated first coupling device (A);
a sixth forward gear (G6) is shiftable via the first clutch (K1) and an activated sixth coupling device (F);
a seventh forward gear (G7) is shiftable as a second one of the at least one winding path gear via the first clutch (K1), the activated first coupling device (A) and the activated first shift element (K).

12. The double clutch transmission according to claim 11, wherein
a first reverse gear (R1) is shiftable via the first clutch (K1) and an activated second coupling device (B);
a second reverse gear (R2) is shiftable as a third one of the at least one winding path gear via the second clutch (K2), the activated second coupling device (B) and the activated first shift element (K);
a second reverse gear (R3) is shiftable as a fourth one of the at least one winding path gear via the second clutch (K2) and the activated second coupling device (B), the activated fourth coupling device (D) and the activated sixth coupling device (F), upon disengagement of the second output coupling device (S_ab2) assigned to the second power take-off gear (13); and
a fourth reverse gear (R4) is shiftable as a fifth one of the at least one winding path gear via the first clutch (K1) and the activated fourth coupling device (D) upon engagement of a second shift element (I).

13. The double clutch transmission according to claim 11, wherein
a crawler gear (C1) is shiftable as a third one of the at least one winding path gear via the first clutch (K1), the activated first coupling device (A), the activated third coupling device (C), the activated fourth coupling device (D) and upon disengagement of a first output coupling device (S_ab1) assigned to a first power take-off gear (12);
a first overdrive gear (O1) is shiftable as a fourth one of the at least one winding path gear via the second clutch (K2), the activated first coupling device (A), the activated third coupling device (C), the activated fifth coupling device (E) and upon disengagement of the first output coupling device (S_ab1) assigned to the first power take-off gear (12); and
a second overdrive gear (O2) is shiftable as a fifth one of the at least one winding path gear via the first clutch (K1), the activated first coupling device (A), the activated fourth coupling device (D), the activated sixth coupling device (F) and upon disengagement of the second output coupling device (S_ab2) assigned to the second power take-off gear (13).

14. The double clutch transmission according to claim 1, wherein
the first forward gear (G1) is shiftable as a first one of the at least one winding path gear via the second clutch (K2), an activated second coupling device (B), an activated fourth coupling device (D), an activated sixth coupling device (F) and upon disengagement of the second output coupling device (S_ab2) assigned to the second power take-off gear (13);
the second forward gear (G2) is shiftable via the first clutch (K1) and the activated second coupling device (B);
the third forward gear (G3) is shiftable via the second clutch (K2) and the activated fourth coupling device (D);
the fourth forward gear (G4) is shiftable via the first clutch (K1) and the activated sixth coupling device (F);
the fifth forward gear (G5) is shiftable via the second clutch (K2) and an activated first coupling device (A);
a sixth forward gear (G6) is shiftable via the first clutch (K1) and an activated third coupling device (C); and
a seventh forward gear (G7) is shiftable as a second one of the at least one winding path gear the first clutch (K1), the activated first coupling device (A), the activated fourth coupling device (D), the activated sixth coupling device (F) and upon disengagement of the second output coupling device (S_ab2) assigned to the second power take-off gear (13).

15. The double clutch transmission according to claim 14, wherein a first reverse gear (R1) is shiftable via the first clutch (K1) and an activated fifth coupling device (E),
a second reverse gear (R2) is shiftable via the second clutch (K2), the activated first coupling device (A), the activated third coupling device (C), the activated fifth coupling device (E) and upon disengagement of a first output coupling device (S_ab1) assigned to the first power take-off gear (12), and
the first and the second reverse gears (R1, R2) are shiftable as a third one of the at least one winding path gear and a fourth one of the at least one winding path gear.

16. The double clutch transmission according to claim 15, wherein a crawler gear (C1) is shiftable as a fifth one of the at least one winding path gear via the first clutch (K1), the activated fourth coupling device (D) and an activated second shift element (I), and
an overdrive gear (O1) is shiftable as a sixth one of the at least one winding path gear via the second clutch (K2), the activated sixth coupling device (F) and the activated second shift element (I).

17. The double clutch transmission according to claim 1, wherein
a first forward gear (G1) is shiftable as a first one of the at least one winding path gear via the second clutch (K2), an activated second coupling device (B), an activated fourth coupling device (D), an activated sixth coupling device (F) and upon disengagement of the second output coupling device (S_ab2) assigned to the second power take-off gear (13);
the second forward gear (G2) is shiftable via the first clutch (K1) and the activated second coupling device (B);
the third forward gear (G3) is shiftable via the second clutch (K2) and the activated fourth coupling device (D);
the fourth forward gear (G4) is shiftable via the first clutch (K1) and the activated sixth coupling device (F);

the fifth forward gear (G5) is shiftable via the second clutch (K2) and an activated first coupling device (A);

a sixth forward gear (G6) is shiftable via the first clutch (K1) and the activated fifth coupling device (E); and a seventh forward gear (G7) is shiftable as a second one of the at least one winding path gear via the first clutch (K1), the activated first coupling device (A), the activated fourth coupling device (D), the activated sixth coupling device (F) and upon disengagement of the second output coupling device (S_ab2) assigned to the second power take-off gear (13).

18. The double clutch transmission according to claim 17, wherein a first reverse gear (R1) is shiftable as a third one of the at least one winding path gear via the first clutch (K1) and an activated third coupling device (C);

a second reverse gear (R2) is shiftable as a fourth one of the at least one winding path gear via the second clutch (K2), the activated third coupling device (C), and the first activated shift element (K);

a third reverse gear (R3) is shiftable as a fifth one of the at least one winding path gear via the second clutch (K2), the activated third coupling device (C), the activated fourth coupling device (D), the activated sixth coupling device (F) and upon disengagement of the second output coupling device (S_ab2) assigned to the second power take-off gear (13);

a fourth reverse gear (R4) is shiftable as a sixth one of the at least one winding path gear via the first clutch (K1), the activated first coupling device (A), the activated third coupling device (C), the activated fourth coupling device (D) and upon disengagement of a first output coupling device (S_ab1) assigned to the first power take-off gear (12);

a fifth reverse gear (R5) is shiftable as a seventh one of the at least one winding path gear via the second clutch (K2), the activated third coupling device (C), the activated fourth coupling device (D), the activated fifth coupling device (E) and upon disengagement of the second output coupling device (S_ab2), assigned to the second power take-off gear (13).

19. The double clutch transmission according to claim 17, wherein a crawler gear (C1) is shiftable as a third one of the at least one winding path gear via the first clutch (K1) and the activated fourth coupling device (D) as well as a second activated shift element (I);

a first overdrive gear (O1) is shiftable as a fourth one of the at least one winding path gear via the second clutch (K2), the activated sixth coupling device (F) and the second activated shift element (I);

a second overdrive gear (O2) is shiftable as a fifth one of the at least one winding path gear via the first clutch (K1), the activated first coupling device (A) and the first activated shift element (K); and a proximal third overdrive gear (O3) is shiftable as a sixth one of the at least one winding path gear via the first clutch (K1), the activated first coupling device (A), the activated fourth coupling device (D), the activated fifth coupling device (E) and upon disengagement of the second output coupling device (S_ab2) assigned to the second power take-off gear (13).

* * * * *